United States Patent
Hodgkins et al.

[11] Patent Number: 5,807,481
[45] Date of Patent: *Sep. 15, 1998

[54] OIL FILTER ASSEMBLY WITH SUPPORT FOR REMOVABLE PLANAR FILTER

[75] Inventors: David H. Hodgkins, Salida; Dale M. Giva, Modesto, both of Calif.

[73] Assignee: Parker-Hannifin Corporation, Cleveland, Ohio

[*] Notice: This patent issued on a continued prosecution application filed under 37 CFR 1.53(d), and is subject to the twenty year patent term provisions of 35 U.S.C. 154(a)(2).

[21] Appl. No.: 732,806

[22] Filed: Oct. 15, 1996

Related U.S. Application Data

[60] Provisional application No. 60/008,995 Dec. 21, 1995.

[51] Int. Cl.⁶ .................................................. B01D 35/147
[52] U.S. Cl. ......................... 210/130; 210/445; 210/455; 210/456; 210/498
[58] Field of Search ..................................... 210/130, 229, 210/231, 445, 455, 456, 498, 224, 227, 228

[56] References Cited

U.S. PATENT DOCUMENTS

| | | | |
|---|---|---|---|
| 966,963 | 8/1910 | Steinkoenig | 210/455 |
| 2,809,754 | 10/1957 | Pudlo | 210/443 |
| 3,361,261 | 1/1968 | Fairey et al. | 210/314 |
| 3,560,377 | 2/1971 | Loeffler | 210/456 |
| 4,446,017 | 5/1984 | Oberg | 210/90 |
| 4,717,472 | 1/1988 | Oberg | 210/90 |

FOREIGN PATENT DOCUMENTS

| | | |
|---|---|---|
| 1 190 155 | 7/1985 | Canada . |
| 3202330 A1 | 9/1982 | Germany . |

Primary Examiner—Matthews O. Savage
Attorney, Agent, or Firm—Christopher H. Hunter

[57] ABSTRACT

A filter assembly includes a base and cover member which together enclose a planar filter element. Each of the base and cover members has a planar face with a central overpressure opening for an overpressure valve, and a radially-extending channel extending from a port on the side of the base or cover member radially inward to the central overpressure opening. The channel is open along the surface of the planar face. According to a first embodiment, a plurality of radially-extending ribs are disposed in even, spaced-apart relation around the planar surface. The ribs define radial fluid flow paths for even distribution of fluid across the planar face, as well as support a surface of the planar filter member. According to one aspect of this embodiment, a central support rib is suspended along the open side of the channel, and is attached at its radially outer end to an outer annular frame, and at its radially inner end to a ring surrounding the central opening. One or more support trusses intersect the central support rib to add rigidity and strength to the rib. According to another aspect, one or more trusses extend substantially perpendicular to the radial channel for support of the filter element along the channel. According to another embodiment of the present invention, a plurality of cylindrical posts extend outwardly from the planar surface to provide fluid flow paths across the planar surface and for support of the filter element. One or more of the posts are disposed along the side edges of the radial channel or a central rib is provided along the channel for support of the filter element along the channel.

40 Claims, 8 Drawing Sheets

OIL FILTER ASSEMBLY WITH SUPPORT FOR REMOVABLE PLANAR FILTER

This application claims the benefit of U.S. Provisional Application No. 60/008,995 filed on Dec. 21, 1995.

FIELD OF THE INVENTION

The present invention relates generally to fluid filters, and more specifically to a filter for filtering oil in an internal combustion engine.

BACKGROUND OF THE INVENTION

Fluid filter assemblies are known for filtering oil in internal combustion engines. Some fluid filters are permanently mounted adjacent the engine and include a reusable filter element which is easily removed from the assembly for inspection and replacement (or cleaning) when the element becomes clogged.

One known type of fluid filter assembly for filtering oil in an internal combustion engine is shown in U.S. Pat. No. 4,446,017. This patent discloses an oil filter having a base and cover member with adjacent planar faces which contain a plurality of corresponding, circular, concentrically-spaced grooves which define a plurality of ribs. A radial groove in the face of each member extends through each of the associated ribs to afford communication between the associated grooves. The filter element of the assembly has an annular planar configuration, and is removably mounted between the base and cover members. The ribs on the base and cover members support opposite surfaces of the filter element. Oil to be filtered is supplied to an inlet opening along the side of the cover member, flows radially inward along the radial groove, and is distributed across the face of the cover member by the circular grooves. The oil passes through the filter element where it is filtered, and the oil is then discharged from the housing through an outlet opening via the circular and radial grooves contained in the base member. This fluid filter assembly has achieved a certain amount of acceptance in the marketplace for its efficient filtering of fluid, its reliability, and for its simple design which makes it relatively easy to remove and clean or clogged filter element.

U.S. Pat. No. 4,717,472 shows a multistage oil filter assembly having many of the attributes of the filter assembly described in the above patent, with the addition of an intermediate planar member disposed between the base and cover members. The intermediate member includes a plurality of segmented circular, concentrically-spaced slots on either surface of the intermediate member which correspond with the grooves in the base and cover member planar faces. A first planar filter element is supported between the cover member and the intermediate members, and a second planar filter element is supported between the intermediate cover member and the base member. When oil enters the filter assembly, it is distributed across the planar face of the cover member (in the manner described previously), passes through the first filter element, through the slots of the intermediate member, through the second filter element, and then exits the housing through the base member (in the manner described previously).

While the above known filter assemblies might provide for properly filtering fluid, e.g., oil, in certain applications, it is believed that there is a demand in the industry for a further improved filter assembly having a removable filter element which distributes fluid evenly across the filter element for efficient filtering of fluid.

SUMMARY OF THE INVENTION

The present invention provides a novel and unique fluid filter assembly with a removable filter element, wherein fluid to be filtered is spread uniformly across the filter element for efficient filtering of the fluid. The fluid filter assembly is reliable and has a structure which makes it easy to remove and replace a clogged filter element. The fluid filter assembly is particularly designed for filtering oil in an internal combustion engine.

According to a first embodiment of the present invention, the filter assembly comprises a base member having a planar face, a cover member having a planar face, and a planar filter member disposed between the planar faces of the base and cover members. The filter member and the planar face of both the base and cover members all preferably have an annular configuration. Appropriate fasteners are provided such that the base and cover members can be secured together—but also easily separated such that the filter member can be removed and cleaned (or replaced) when necessary. An important aspect of the first embodiment is that the base and cover members each have a plurality of ribs which extend radially across the planar face of a respective base or cover member. The ribs have side edges lying in a common plane for support of a surface of the filter element. Certain of the ribs can have a radially outer end integral with an outer annular sidewall, while others of the ribs have an outer end which is spaced radially inward from the annular sidewall. The sidewall bounds the planar surface and serves as a peripheral seal location for the filter element. Some of the ribs also extend only a short distance radially inward toward the center of the base or cover member, while others extend further radially inward and define an annular fluid groove around a central overpressure opening. The central overpressure opening has an outwardly-extending ring or collar which serves as an inner seal location for the filter element.

An inlet port is provided along the side edge of the cover member, while an outlet port is provided along the side edge of the base member. Each port is connected to a channel which extends radially inward to the overpressure opening. The channel has an open side along the planar face of the respective member. Fluid flowing into the inlet port in the cover member passes radially inward along the channel toward the overpressure opening and also outward through the open side of the channel. The fluid is directed around the annular fluid groove surrounding the overpressure opening, and then radially outward between the ribs for an even distribution of fluid across the surface of the filter element. The fluid then passes through the filter element, is collected between the ribs in the base member, and flows radially inward to the annular channel surrounding the overpressure opening in the base member. The fluid is then collected in the radial channel in the base member, where the fluid is then directed radially outward through the outlet port. An overpressure valve can be located in the overpressure opening to allow fluid to bypass the filter element when the filter element becomes clogged, and to provide a remote signal to an operator to clean (or replace) a spent filter element.

According to one aspect of this embodiment, a channel support rib is suspended centrally along the radial channel in both the base and cover members for support of the filter element along the channels. The channel support rib is connected at is radially outer end to the annular sidewall, and at its radially inner end to the ring surrounding the overpressure opening. A pair of support trusses extend from a location on the planar face surrounding the channel and intersect opposite sides of the central rib to provide rigidity and strength. According to another aspect of this embodiment, a plurality of trusses replace the central support rib and extend across the channel substantially perpendicular thereto. The trusses are positioned at radially spaced-apart intervals along the channel and also support the filter element along the channel.

As such, as described above, the radial ribs on the base and cover members provide fluid flow paths across the base and cover members for the even distribution of fluid, as well as support opposite sides of the planar filter member.

According to a second embodiment of the present invention, a plurality of cylindrical posts are interspersed across the planar face of the base and cover members. The circular posts have distal ends which lie in a common plane for support of a surface of the filter element, and provide flow paths for the uniform distribution of fluid across the surface of the base and cover members. One or more of the posts are provided along each side of the radial channel for supporting the filter element along the channel. Alternatively, the channel support rib and support trusses described in the first embodiment can be used along the radial channel for support of the filter element.

Thus, as described above, the present invention provides a unique fluid filter assembly having a removable filter element which provides for the even distribution of fluid across the filter element for efficient filtering of fluid, and in particular oil, in an internal combustion engine. The fluid filter assembly is reliable and has a structure which makes it easy to remove and clean (or replace) a clogged filter element.

Further features and advantages will become apparent upon reviewing the following detailed description and accompanying drawings.

DETAILED DESCRIPTION OF THE PREFERRED EMBODIMENT

Figure 1:
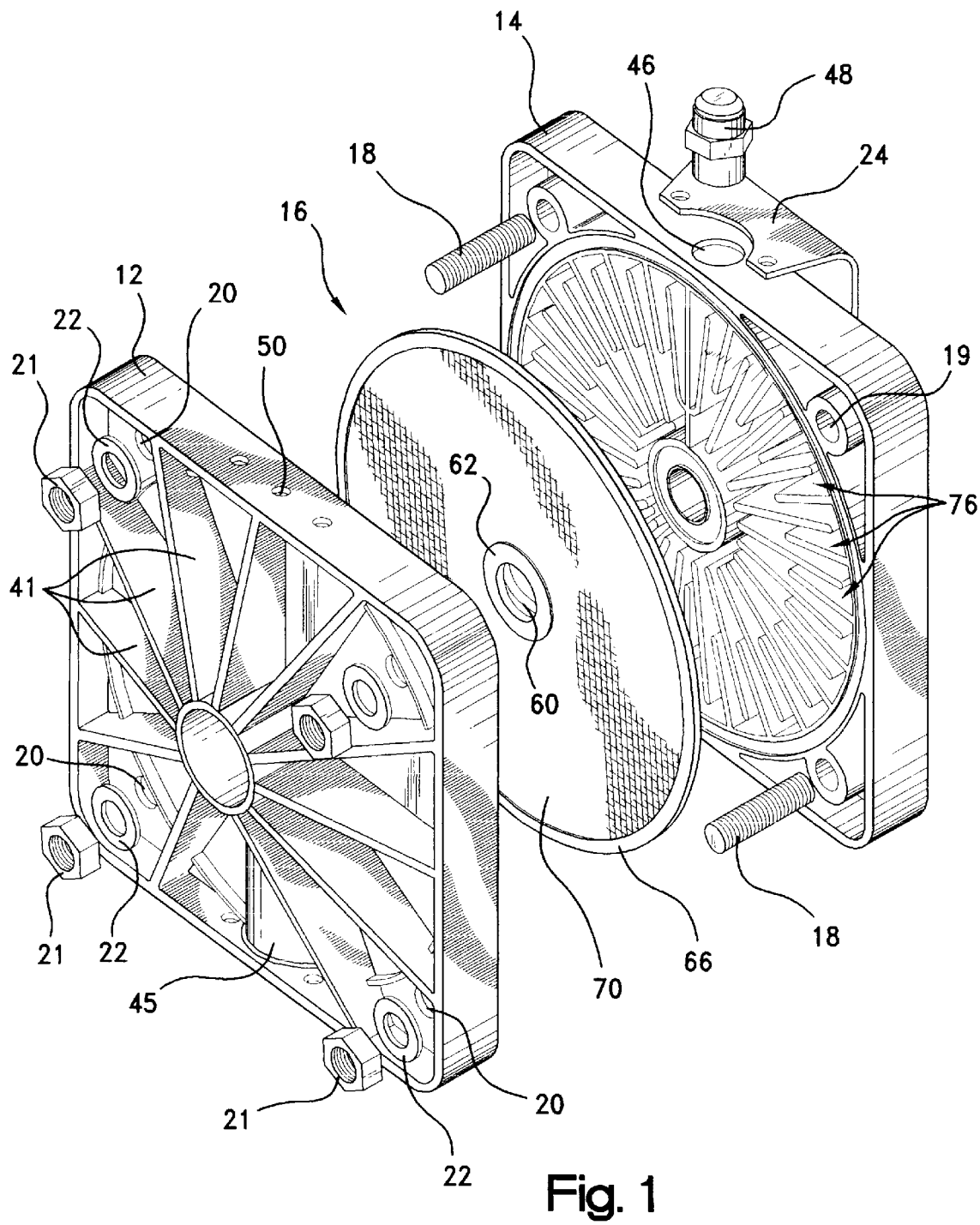
FIG. 1 is an elevated perspective view of a fluid filter assembly constructed according to the principles of the present invention, shown partially disassembled.
Figure 2:
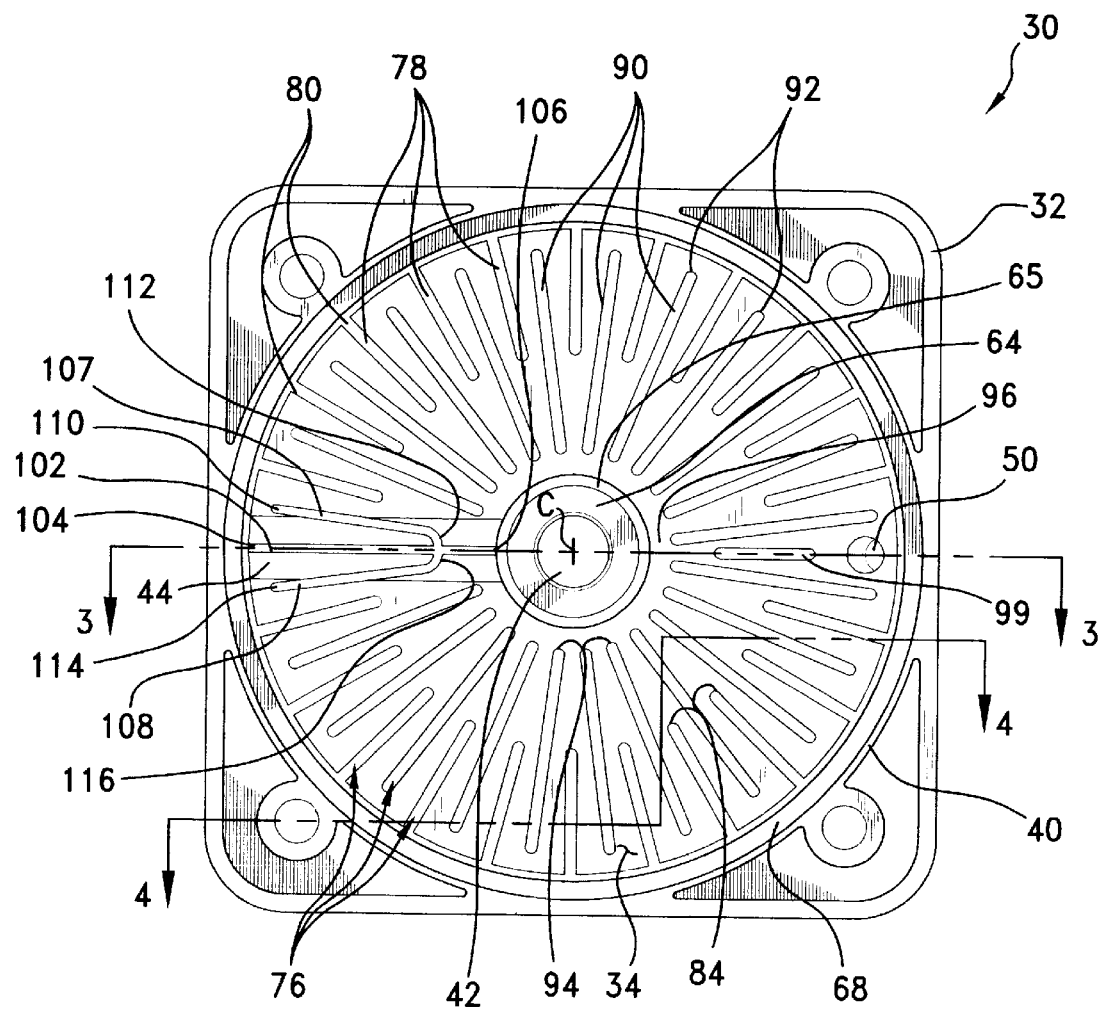
FIG. 2 is a top plan view of one of the base and cover members of the fluid filter assembly of FIG. 1.

Referring to the drawings, and initially to FIG. 1, a fluid filter assembly constructed according to the principles of the present invention is illustrated generally at 10. The filter assembly comprises a first casting member 12 which is conventionally referred to as a "cover", and a second casting member 14 which is conventionally referred to as a "base". A filter element, indicated generally at 16 is disposed between cover member 12 and base member 14. A plurality of conventional fasteners secure cover member 12 to base member 14. For example, bolts 18 can be screwed down in threaded openings 19 in base member 14, and pass through openings 20 formed in cover member 12. Nuts 21 and washers 22 are located over bolts 18 to securely, yet removably, fasten cover member 12 to base 14, thereby enclosing filter element 16 between these two members. As should be apparent, filter element 16 can be easily accessed by removing nuts 21 from bolts 20 and separating the cover member 12 from base member 14.

Filter assembly 10 is designed to be incorporated into a fluid system, for example, an oil filtration system of an internal combustion engine. To this end, the filter assembly includes a bracket 24 or other conventional support apparatus which is fixedly secured to one of the base or cover members and allows the filter assembly to be mounted at an appropriate location within the fluid system.

As will be described herein, the base and cover members preferably comprise substantially identical structures for ease of manufacturing and assembly. As such, where appropriate, only one of the base or cover members will be described below, with the understanding that the structure is the same for the other member. However, while it is preferred that the base and cover members are identical, it should be apparent to those skilled in the art that the base and cover members could also be different and still achieve the objectives of the present invention.

With the above in mind, referring now to FIGS. 2–5, one of the base or cover members is illustrated generally at 30. The member includes an outer housing frame 32 which, as illustrated, preferably has a square or rectangular shape with rounded corners, although the shape of the base and cover members will generally be dictated by the necessities of the particular application. On one (interior) side of member 30, the outer frame bounds a planar surface 34 which has a predetermined peripheral configuration, for example annular, although this can also vary depending upon the particular application. On the other (exterior) side of the member, a series of radially-extending support struts 41 (FIG. 1) can be provided to provide rigidity and strength.

Figure 3:
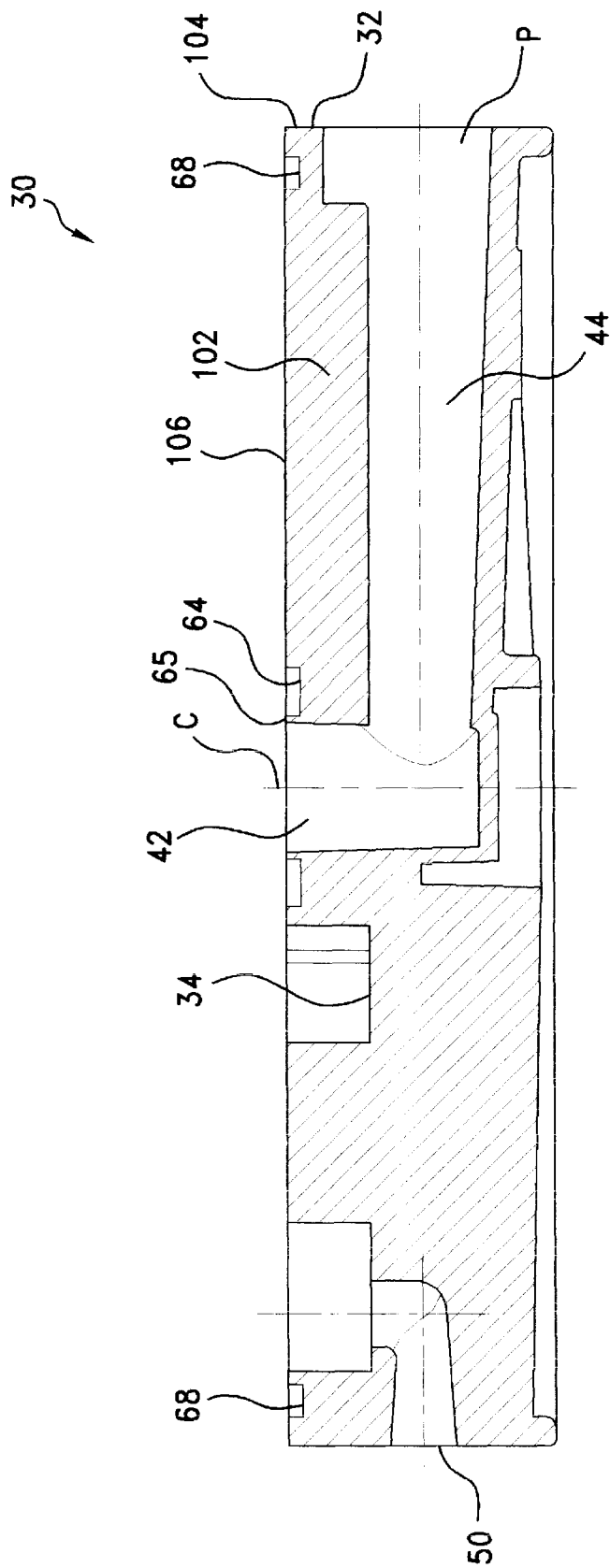
FIG. 3 is a cross-sectional side view of one of the base or cover members, taken substantially along the plane described by lines 3—3 of FIG. 2.
Figure 4:
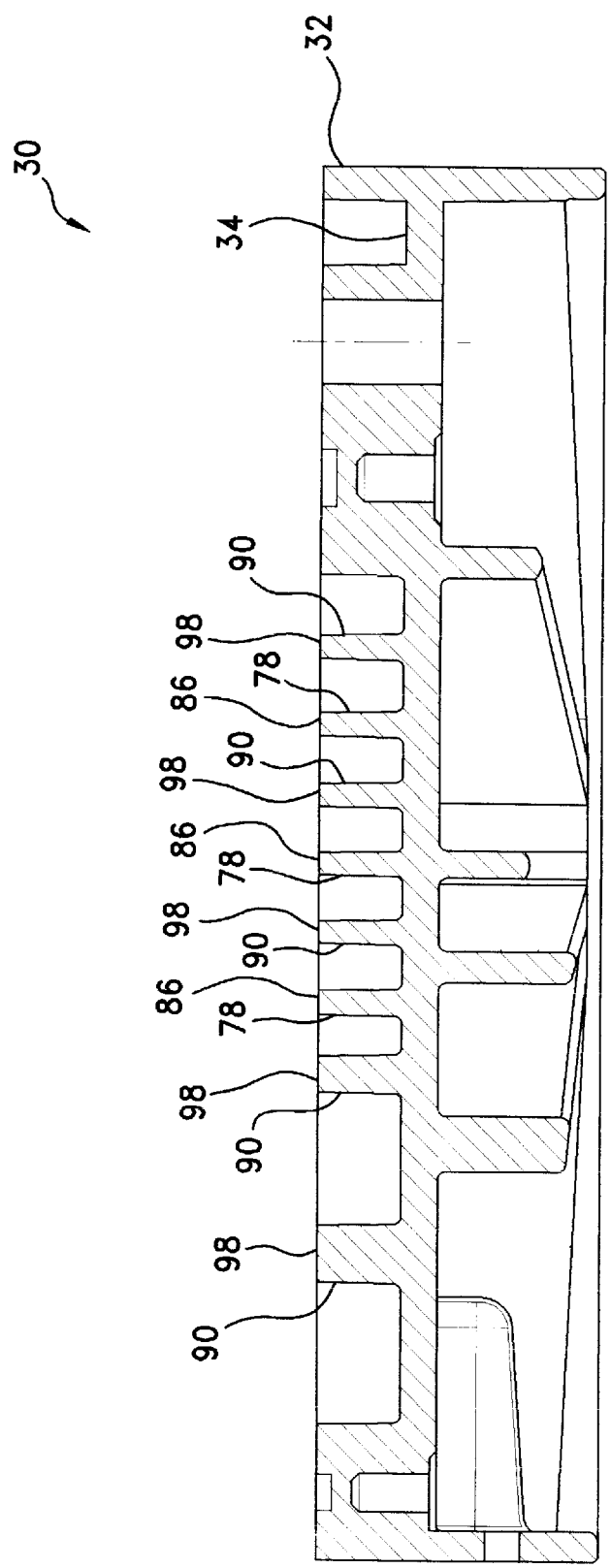
FIG. 4 is a cross-sectional side view of one of the base or cover members, taken substantially along the plane described by the lines 4—4 of FIG. 2.

The planar surface 34 on the interior side of member 30 is indented within frame 32, and as such, an outer, axially-extending peripheral lip or sidewall 40 is provided having the same configuration as the planar surface, e.g., annular. An annular opening 42 is provided at the geometric center of planar surface 34. Opening 42 comprises a bore which extends axially through at least a portion of frame 32 in a direction substantially perpendicular to planar surface 34. Opening 42 preferably comprises a blind end bore (as illustrated in FIG. 3) for the cover member, and a through-bore (not shown) for the base member. In any case, a radially-extending channel 44 intersects the bore and extends outwardly to the periphery of the frame. Channel 44 is open along its side along planar face 34 (see, e.g., FIG. 1), and extends radially outwardly to a port "P" along the side of frame 32. For the cover member 12, this port is preferably an inlet port, indicated at 45 in FIG. 1, while for the base member 14, this port is preferably an outlet port, indicated at 46 in FIG. 1. Preferably, the cover and base member are arranged such that inlet port 45 is diametrically opposite from outlet port 46. To facilitate connecting the inlet and outlet ports within the fluid system, appropriate fixtures can be attached, e.g., threaded, into the port, for example the fixture illustrated at 48 for outlet port 46 in FIG. 1.

An overpressure valve is typically located in the throughbore in base 14. A conventional overpressure valve comprises a spring-biased ball which normally prevents fluid from flowing through opening 42 to outlet port 46 in base 14, but when a predetermine fluid pressure across the filter element 16 is reached, allows fluid to flow through this passage. As should be known to those skilled in the art, an overpressure valve allows fluid to bypass a clogged filter element and flow substantially unfiltered to the engine for continued operation of the engine until the filter element can be replaced or cleaned. Typically, an external electrical sensor is provided on the overpressure valve to provide the operator with an indication that the filter element is clogged when the valve moves to its open, bypass position. A conventional overpressure valve is described in U.S. Pat. No. 4,717,472, which for these purposes is incorporated herein by reference.

Each of the base and cover member also preferably includes an auxiliary or drain port 50 preferably formed on the diametrically opposite side from the port P. Auxiliary port 50, as shown in FIG. 3, extends radially inwardly from an external opening on the side of frame 32 to an internal opening on planar face 34. Auxiliary port 50 can provide a drain for the filter assembly when the filter element must be cleaned or replaced, and to this end can have a removable plug (not shown) inserted into its external opening, or can include other auxiliary components, which are conventional in the art and are not described herein for sake of brevity.

Preferably, the cover and base members 12, 14 are formed from conventional material, such aluminum, using conventional techniques known to those skilled in the art, for example die-casting, drilling and grinding.

Referring again to FIG. 1, filter element 16 is supported between cover 12 and base 14. Filter element 16 preferably comprises a planar member having an inner central opening 60 which is aligned with central opening 42 in the base and cover members when these members are secured together. An annular elastomeric gasket 62 surrounds opening 60. Gasket 60 is sized so as to be received within a seating channel 64 (FIG. 2) formed in an axially outwardly-projecting ring or collar 65 surrounding the central opening 42. Gasket 60 provides a fluid-tight seal between the filter element and the channel 64 in both the cover and base members. In addition, an outer elastomeric gasket 66 extends circumferentially around the periphery of the filter element and is designed to be located within an outer seating channel 68 (FIGS. 2,3) formed in side wall 40. Gasket 66 provides a fluid-tight seal between the filter element and channel 68 in both the base and cover members. Filter element 16 includes a mesh 70 such as a wire screen having openings on the order of 200 microns which extends between inner gasket 62 and outer gasket 66. Filter mesh 70 is chosen so as to have a particular efficiency, and is formed from a particular material which is appropriate for the intended application.

As indicated above, filter element 16 is supported between cover 12 and base 14. To this end, as illustrated in FIGS. 1–4, each of the base and cover members includes a plurality of radially-projecting ribs, indicated generally at 76. Preferably, ribs 76 comprise a first set of outer ribs and a second set of inner ribs. Specifically, the first set of outer ribs, indicated at 78, project radially inward from outer sidewall 40 toward the geometric center "C" of housing frame 32. That is, ribs 78 have radially outer ends 80 which are integral with outer sidewall 40 and inner ends 84 which are spaced radially inwardly from outer end 80, and thus closer to the geometric center "C" of the frame. Ribs 78 are spaced evenly around the planar face 34 and have flat upper edges 86 (FIG. 4) which generally lie in a common plane with each other to support a surface of the filter element.

The second, inner set of ribs are indicated at 90. Ribs 90 have radially-outer distal ends 92 which are spaced a short distance radially inward from outer sidewall 40. Ribs 90 also have radially inner ends 94 which are located proximate inner ring 65. Preferably, the radially inner ends 94 of ribs 90 are spaced the same distance radially outward from ring 65 such that an annular flow gap or channel 96 is provided between the radially inner ends of ribs 90 and ring 65. Ribs 90 are likewise spaced evenly around the circumference of planar face 34, and preferably are interposed between adjacent outer ribs 78. Inner ribs 90 also preferably have flat upper edges 98 which lie in a common plane with the upper edges 86 of outer ribs 78 to support the surface of the filter element. The particular dimensions (i.e., thickness, length, height) of the ribs will vary depending upon the particular application, however, the ribs are preferably thin enough to maximize the flow area between the ribs and minimize material costs, but thick enough to withstand the pressures within the filter.

It is noted that at the location of auxiliary port 50, one of the outer set of ribs, indicated at 99, has a radially outer distal end which is spaced inwardly from outer sidewall 40 to accommodate the internal opening to this port. In addition, the radially inner end of rib 99 can be spaced slightly closer to the axis "C" than the inner ends of the other outer ribs 78.

Further, the ribs are also interrupted at the location of radial channel 44. To support the filter element along this channel, a central support rib, indicated at 102, is suspended centrally along channel 44 (see, e.g., FIG. 3). Central rib 102 has a radially outer end 104 which is integral with outer sidewall frame 40 and a radially inner end which is integral with inner ring 65. Support rib 102 has an upper edge 106 which lies in a common plane with the upper edges 86, 98, of all the other ribs for support of the filter element at this location. To provide additional rigidity and strength for central support rib 102, a pair of truss ribs 107, 108 are provided on opposite sides of central support rib 102. Specifically, first truss rib 107 extends from a radially outer end 110 located on planar surface 34 at a location surrounding channel 44, to a radially inner end 112 which intersects one side of central rib 102. Likewise, second truss rib 108 extends from a radially outer end 114 which is located on planar surface 34 at a location surrounding channel 44 to a radially inner end 116 which intersects the other side of rib 102. It is noted that the radial inner end 112 of truss 107 and the radially inner end 116 of truss 108 are also suspended above channel 44. Truss ribs 107, 108 can have various configurations, however, it is preferred that the truss ribs have a relatively straight outer section which curves generally inward toward the central rib at the inner end of each truss rib, such that the truss ribs 107, 108 together define an generally U or V-shaped configuration. In this manner, truss ribs 107, 108 intersect opposite sides of central support rib 102 to provide rigidity and strength. Truss ribs 107, 108 can also have upper edges which lie in a common plane with the upper edges of all the other ribs. Outer ribs 76, inner ribs 90, central support rib 102 and truss ribs 107, 108 are preferably formed in one piece with the planar surface 34 using the conventional techniques described previously.

Figure 5:
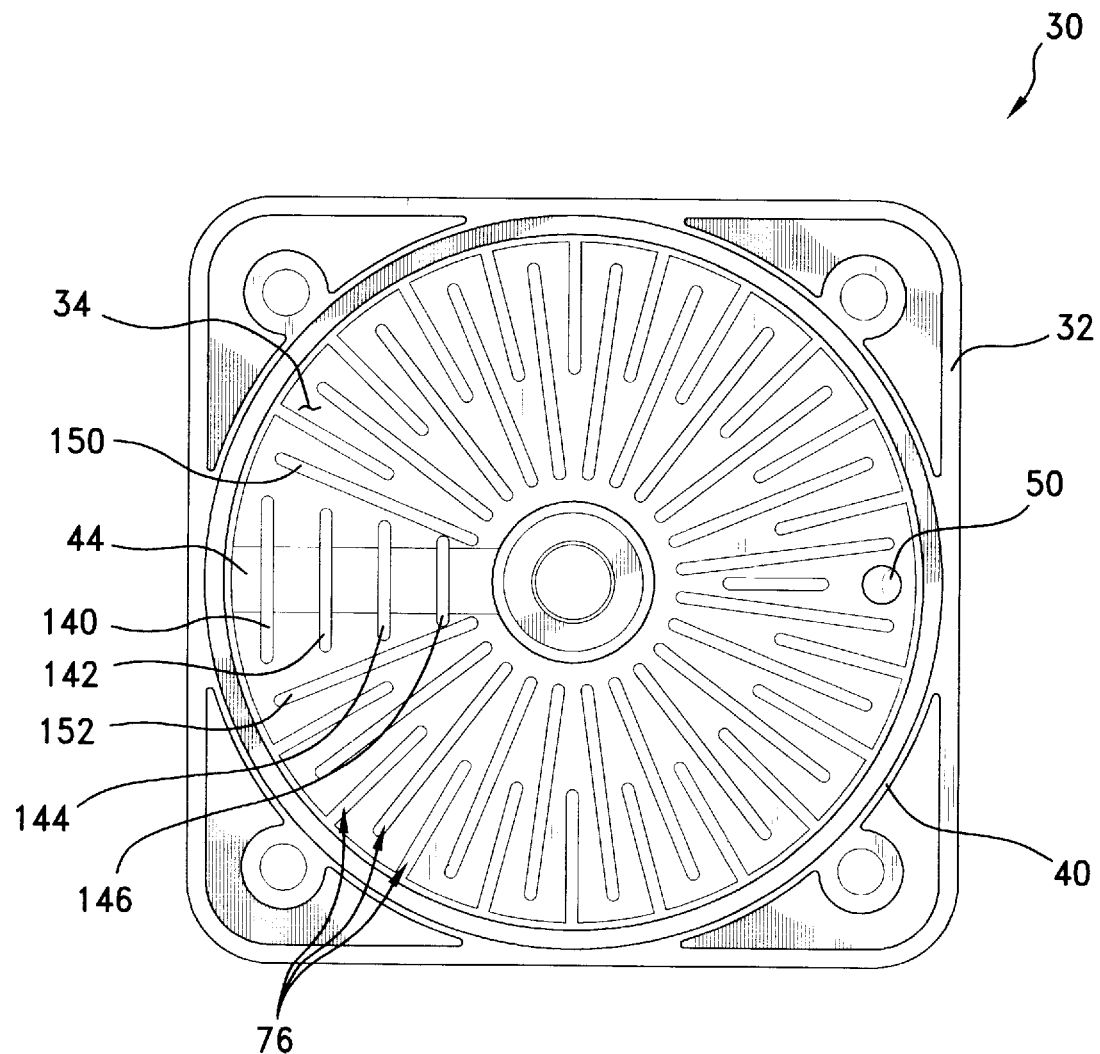
FIG. 5 is a top plan view of one of the base or cover members for the fluid filter assembly of FIG. 1 according to a further aspect of the present invention.

Referring to an additional aspect of this embodiment, illustrated in FIG. 5, the central support rib and truss ribs can be replaced with a series of truss ribs which extend substantially perpendicular to radial channel 44 along planar face 34. Specifically, truss ribs 140, 142, 144 and 146 can be disposed at radially-spaced locations along channel 44 and extend entirely across the channel to be integrally attached along the sides of the channel to planar surface 34. The truss ribs can have slightly longer lengths for the truss ribs which are spaced further radially outward from the axis "C", since the outer ribs need to cover a wider area between radial ribs 76 than the inner ribs. In addition, the radially innermost truss rib 146 can extend between and interconnect adjacent radial ribs 150 and 152. Trusses 140–146 can have also have their upper edges in a common plane with the upper edges of the other ribs for support of the filter element. Also according to this aspect, it is noted that the radial ribs 76 can all have their radially outer ends spaced a distance from outer sidewall 40 for fluid flow therebetween, without compromising the support for the filter element. The remainder of the structure of frame 32 in this aspect of this embodiment is the same as described previously, and will not be replicated herein for sake of brevity.

The fluid flow through the filter assembly of this embodiment will now be briefly described. Fluid flows into the filter through inlet port 46 in cover member 12 and flows radially inward along inlet channel 44 toward central opening 42. Fluid also flows outward from the open side of channel 44 around either central support rib 102 and truss ribs 107, 108 (FIGS. 2–4), or around truss ribs 140–146 (FIG. 5). In either case, the fluid tends to flow radially inward and around the channel 96 provided around ring 65 and then radially outwardly between all of ribs 76 for an even distribution of fluid across the planar face 34 of the cover. The fluid then flows axially through the mesh in filter element 16, and is collected by the corresponding radial ribs in base member 14. The fluid then flows radially inward between the ribs around the corresponding channel 96 formed around ring 65 in the base member, and into channel 44, where the fluid then passes radially outward through the channel to the outlet port 46. When the filter element 16 becomes clogged with particulates or other contaminants, the overpressure valve will open and provide a flow path through port 42 in the base and cover members, as well as a remote indication that the filter element needs to be inspected and cleaned or replaced. If necessary, a drain plug in auxiliary port 50 can be removed to drain fluid in the filter assembly prior to separating the cover from the base. Owing to the relatively low internal volume of the housing, only a small amount of fluid is lost during removal of the filter.

Figure 6:
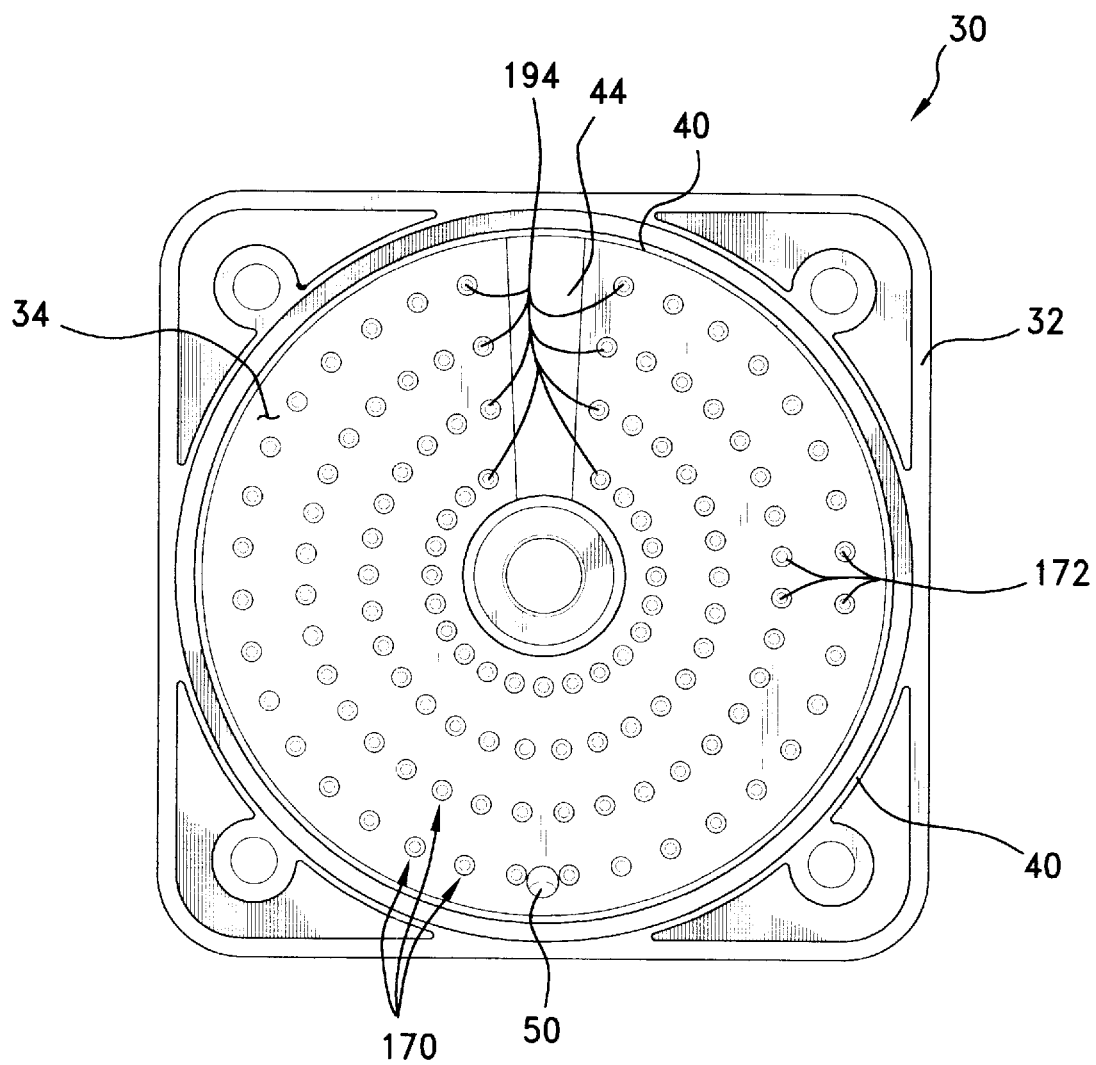
FIG. 6 is a top plan view of one of the base or cover members for a fluid filter assembly constructed according to a second embodiment of the present invention.
Figure 7:
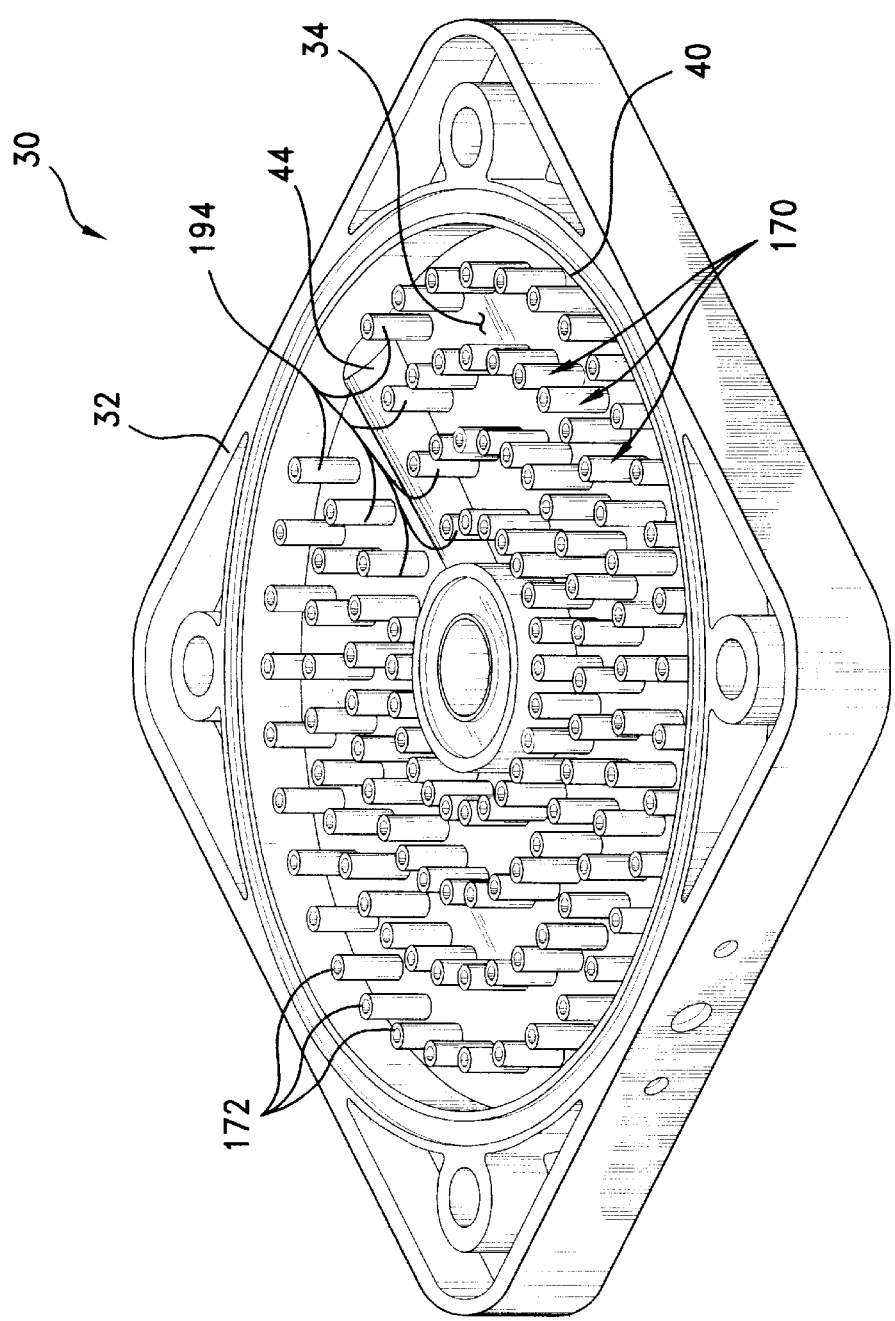
FIG. 7 is an elevated perspective view of the base or cover member of FIG. 6.

Referring now to an additional embodiment of the present invention, illustrated in FIGS. 6 and 7, the base or cover for the filter element can include another means for supporting filter element 16. Specifically, a plurality of posts or oblisques, indicated generally at 170, can be disposed in even, spaced-apart relation across planar surface 34. Preferably, posts 170 are cylindrical and have inner ends which are integrally formed with the planar surface, and outer distal ends 172 which all lie in a common plane for support of the filter element. The outer ends 172 of posts 170 can be slightly rounded or preferably have flat tops with rounded corners to prevent piercing the filter element. The number and spacing of posts 170 is dependent upon the particular requirements of the application, however, the posts are preferably arranged in a random, equally-spaced apart manner across the surface, although the posts could also be arranged in concentric, radially spaced-apart rings across the surface of the filter as illustrated in FIGS. 6 and 7, with each ring or posts being evenly spaced from an adjacent ring. Four rings of posts are illustrated in FIGS. 5 and 6 with the posts being spaced apart at approximately 10° intervals, although again this can change depending upon the particular application. As with the ribs described above with respect to the first embodiment, the space between the individual posts provides fluid paths across the planar face for an even distribution of fluid.

Figure 8:
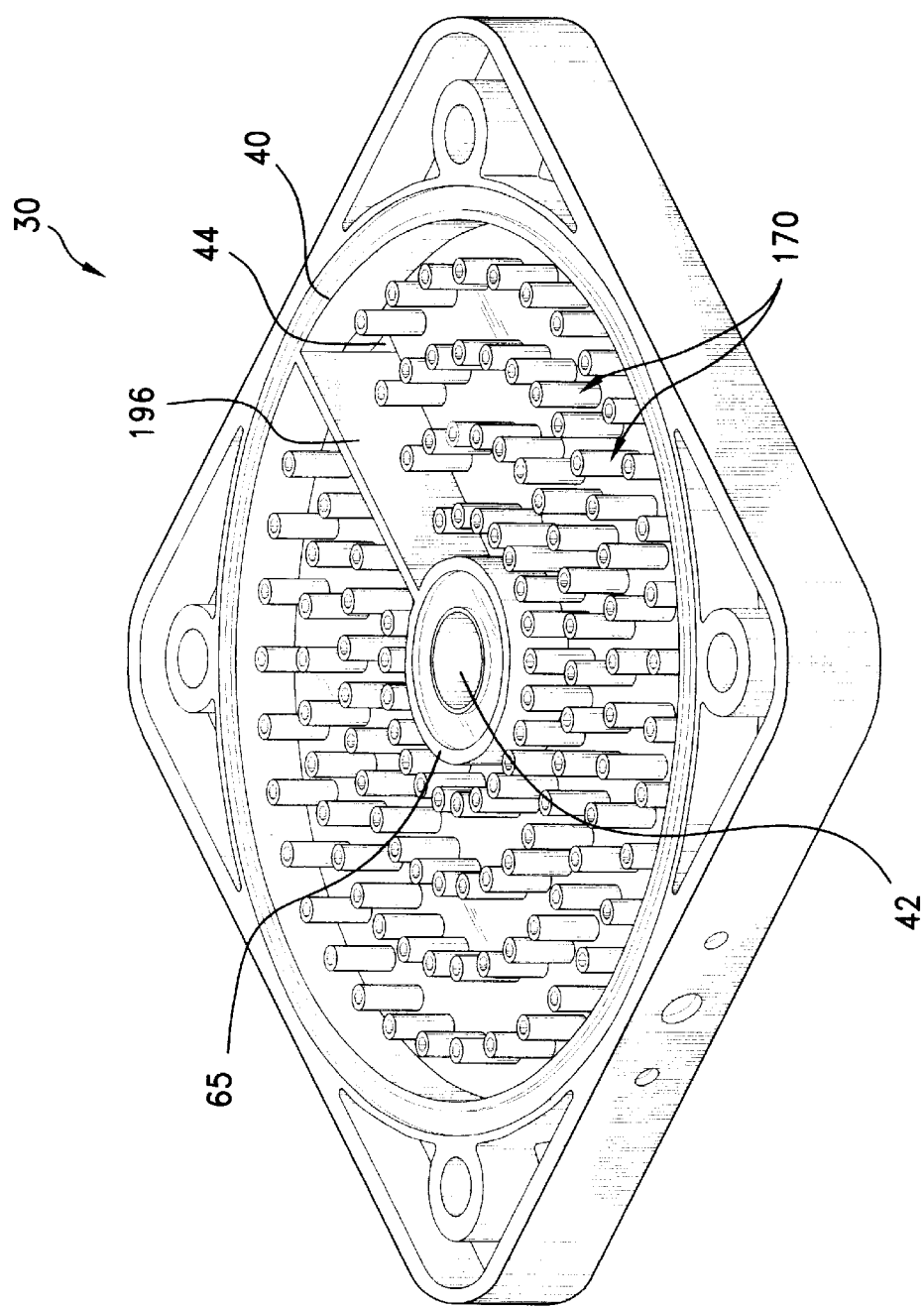
FIG. 8 is an elevated perspective view of the base or cover member of FIG. 6 showing a further aspect of the second embodiment.

Preferably, one or more posts, indicated at 194, are located along the side edges of channel 44 on planar face 34 for support of the filter element along the channel. Preferably, four posts are provided along each side edge of channel 44 for appropriate support of the filter element. Alternatively, as illustrated in FIG. 8, a central rib 196 can be used to support the filter element along the channel. Rib 196 can be formed integrally with outer sidewall 40 and extend along the open side of channel 44 to ring 65 surrounding opening 42 for support of the filter element. Rib 196 preferably has the same structure as central rib 102 in the first embodiment, and will not be described further for sake of brevity.

The fluid flow across the filter components in this embodiment is substantially the same as described previously, with the fluid flow passing in all directions between the posts. The remainder of the housing frame 32 is also the same as described previously, and will not be repeated for sake of brevity.

In any of the embodiments described above, the present invention provides an improved fluid filter assembly which provides for the even distribution of fluid across a filter element for efficient filtering of fluid. While the filter assembly has been particularly described above for use with an engine such as an automobile internal combustion engine, it should be apparent to those skilled in the art that the filter assembly is suitable for use in other fluid systems where oil, water, air or other types of fluid are to be filtered.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. A filter assembly, comprising:

a base member having a planar face, a cover member having a planar face and a planar filter element disposed between said planar faces of said base and cover members, one of said base and cover members having an outer frame extending away from the face of the one member around the periphery of the one member, an inner ring extending outwardly from the face of the one member and surrounding a central over-pressure opening along the geometric axis of the one member, and a plurality of ribs, each of said ribs projecting outwardly from the planar face of the one member and having a major longitudinal axis extending in a radial direction away from the central over-pressure opening toward the periphery of said one member and a minor lateral axis extending perpendicular to the radial direction, said radially extending ribs i) defining radial flow passages along the planar face of the one member, and ii) supporting a surface of said planar filter element, a channel formed into the planar face of said one member extending radially inward from a peripheral port in said one member to fluidly interconnect the port with the central over-pressure opening, said channel having an open side along the face of the one member from the outer frame to the inner ring, at least one of said ribs being located on said planar face for supporting the surface of said filter element along said channel, and the other of said base and cover members also including a peripheral port communicating with a central, over-pressure opening and a support which supports another surface of the planar filter element, and which defines flow passages along the face of the other member.

2. The filter assembly as in claim 1, wherein each of said ribs has an outer distal edge, and the outer distal edges of at least some of said ribs lie in a common plane for supporting the surface of said filter element.

3. The filter assembly as in claim 1, further including at least one truss rib extending across said radial channel substantially perpendicular thereto.

4. The filter assembly as in claim 3, wherein a plurality of truss ribs extend across said radial channel at spaced-apart locations radially outward along said channel.

5. The filter assembly as in claim 1, wherein said radially-extending ribs have radially inner ends spaced apart from said ring for defining an annular flow channel which fluidly interconnects said radial flow passage.

6. The oil filter assembly as in claim 1, wherein said base and cover members are substantially identical to each other.

7. The filter assembly as in claim 1, wherein a first end of said ribs are radially closer to the central over-pressure opening than a second end of said ribs.

8. The filter assembly as in claim 1 wherein the radial ribs define radial grooves between adjacent ribs.

9. The filter assembly as in claim 1, wherein said at least one of said ribs is suspended over said channel.

10. The filter assembly as in claim 9, wherein said at least one of said ribs extends across said channel, from the inner ring to the outer frame.

11. The filter assembly as in claim 9, wherein said at least one of said ribs extends across said channel, from the planar face on one side of said channel to the planar face on the other side of said channel.

12. A filter assembly, comprising:
a base member having a planar face,
a cover member having a planar face, and
a planar filter element disposed between said planar faces of said base and cover members, one of said base and cover members having an outer frame extending away from the face of the one member around the periphery of the one member, an inner ring extending outwardly from the face of the one member and surrounding a central over-pressure opening along the geometric axis of the one member and a plurality of posts, each of said posts having an axial length extending outwardly away from the planar which is greater than its maximum lateral dimension extending along the planar face, said posts projecting outwardly from the planar face of the one member and interspersed across the planar face from the central over-pressure opening to the periphery of the face, said posts i) defining flow passages along the planar face of the one member, and ii) having distal ends in a common plane for supporting a surface of said planar filter, a channel formed into the planar face of said one member extending radially inward from a peripheral port in said one member to fluidly interconnect the port with the central over-pressure opening, said channel having an open side along the face of the one member from the outer frame to the inner ring, at least some of said posts being disposed on said planar face along the open side of said channel for supporting the surface of said filter element along said channel, and the other of said base and cover members also including a peripheral port communicating with a central over-pressure opening and a support which supports another surface of the planar filter element, and which defines flow passages along the face of the other member.

13. The filter assembly as in claim 12, wherein said posts are cylindrical.

14. The filter assembly as in claim 12, further including a rib suspended over said channel for supporting the surface of said filter element along said channel.

15. The filter assembly as in claim 14, wherein said rib extends across said channel, from outer frame to the inner ring.

16. A filter assembly, comprising:
a base member having a planar face,
a cover member having a planar face, and
a planar filter element disposed between said planar faces of said base and cover members, each of said base and cover members having an outer frame extending away from the face of the one member around the periphery of the one member, an inner ring extending outwardly from the face of the one member and surrounding a central over-pressure opening along the geometric axis of each of the respective members, and a plurality of ribs projecting outwardly from the planar face of the on member, with each of said ribs having a major longitudinal axis extending in a radial direction away from the central over-pressure toward the periphery of the member and a minor axis extending perpendicular to the radial direction, said radially extending ribs i) defining radial flow passages along the planar face of the respective member, and ii) supporting a respective surface of said planar filter element, a channel formed into the planar face of the member extending radially inward from a peripheral port in the member to fluidly interconnect the port with the central over-pressure opening, said channel having an open side along the face of the member from the outer frame to the inner ring, at least one of said ribs being located on said planar face for supporting the respective surface of said filter element along said channel.

17. The filter assembly as in claim 16, wherein said at least one of said ribs is suspended over said channel.

18. The filter assembly as in claim 17, wherein said at least one ribs extends across said channel, from the inner ring to the outer frame.

19. The filter assembly as in claim 17, wherein said at least one of said ribs extends across said channel, from the planar face on one side of said channel to the planar face on the other side of said channel.

20. A filter assembly, comprising:
a base member having a planar face,
a cover member having a planar face, and
a planar filter element disposed between said planar faces of said base and cover members, each of said base and cover members having an outer frame extending away from the face of the one member around the periphery of the one member, an inner ring extending outwardly from the face of the one member and surrounding a central over-pressure opening along the geometric axis of the one member, and a plurality of posts, each of said posts having an axial length extending outwardly away from the planar face which is greater than its maximum lateral dimension extending along the planar face, said posts projecting outwardly from the planar face of the one member and interspersed across the planar face from the central over-pressure opening to the periphery of the face, said posts i) defining flow passages along the planar face of the respective member, and ii) having distal ends in a common plane for supporting a respective surface of said planar filter, a channel formed into the planar face of each respective member extending radially inward from a peripheral port in said member to fluidly interconnect the sort with the central over-pressure opening, said channel having an open side along the face of the member from the outer frame to the inner ring, at least some of said posts being disposed on said planar face along the open side of said channel for supporting the respective surface of said filter element along said channel.

21. The filter assembly as in claim 20, further including a rib suspended over said channel for supporting the surface of said filter element along said channel.

22. The filter assembly as in claim 21, wherein said rib extends across said channel, from the outer frame to the inner ring.

23. A filter assembly, comprising:
a base member having a planar face,
a cover member having a planar face, and
a planar filter element disposed between said planar faces of said base and cover members, one of said base and cover members having a central over-pressure opening and a plurality of ribs projecting outwardly from the planar face of the one member and extending radially away from the central over-pressure opening toward the periphery of said one member, said radially extending ribs i) defining radial flow passages along the planar face of the one member, ii) supporting a surface of said planar filter element, and iii) each having an outer distal edge, the outer distal edges of at least some of said ribs lying in a common plane for supporting the surface of said filter element, a channel formed in said one member extend radially inward from a peripheral port in said one member to the central over-pressure opening, at least one of said ribs being located on said planar face for supporting the surface of said filter element along said channel, and wherein said one member includes an outer frame extending away from the face of said one member circumferentially around the periphery of the member and an inner ring extending outwardly from the face of the one member and surrounding the central opening, said channel having an open side along the face of the member from the inner ring to the outer frame, said at least one of said ribs extending from said outer frame to said inner ring to support said filter element along said open side of said channel, and the other of said base and cover members also including a peripheral port communicating with a central over-pressure opening and a support which supports another surface of the planar filter element, and which defines flow passages along the face of the other member.

24. The filter assembly as in claim 23, wherein said at least one rib is suspended above said radial channel.

25. The filter assembly as in claim 24, further including a truss rib extending along at least a portion of said planar face and intersecting said suspended rib along the length of the suspended rib to strengthen the suspended rib.

26. The filter assembly as in claim 25, further including a second truss rib extending along at least a portion of said planar face and intersecting said channel support rib along the length of said channel support rib, one of said truss ribs intersecting said channel support rib on one side of said support rib and another of said truss ribs intersecting said channel support on another side of said channel support rib, said truss ribs extending to a location on said planar face of said one member which surrounds said channel.

27. The filter assembly as in claim 26, wherein said truss ribs each have a somewhat radially-extending portion integral with said planar face and a curved portion extending across said open channel and intersecting said channel support rib.

28. A filter assembly, comprising;
a base member having a planar face,
a cover member having a planar face, and
a planar filter element disposed between said planar faces of said base and cover members, one of said base and cover members having a central over-pressure opening and a plurality of ribs project outwardly from the planar face of the one member and extending radially away from the central over-pressure opening toward the periphery of said one member, said radially extending ribs i) defining radial flow passages along the planar face of the one member, and ii) supporting a surface of said planar filter element, a channel formed in said one member extending radially inward from a peripheral port in said one member to the central over-pressure opening, said channel having an open side along the face of the one member from an outer frame around the periphery of the one member to an inner ring surrounding the central opening, four truss ribs located on said planar face and extending across said radial channel substantially perpendicular thereto and at spaced-apart locations radially outward along said channel for supporting the surface of said filter element along said channel, and the other of said base and cover members also including a peripheral port communicating with a central over-pressure opening and a support which supports another surface of the planar filter element, and which defines flow passages along the face of the other member.

29. A filter assembly, comprising:
a base member having a planar face,
a cover member having a planar face, and
a planar filter element disposed between said planar faces of said base and cover members, one of said base and cover members having an outer frame extending away from the face of the one member around the periphery of the one member, an inner ring surrounding a central over-pressure opening along the geometric axis of the one member, and a plurality of ribs projecting outwardly from the planar face of the one member, each of said ribs having a major longitudinal axis extending radially away from the central over-pressure opening toward the periphery of said one member and a minor axis extending perpendicular to the radial direction, said radially extending ribs i) defining radial flow passages along the planar face of the one member, and ii) supporting a surface of said planar filter element, a channel formed into the planar face of said one member extending radially inward from a peripheral port in said one member to fluidly interconnect the port to the central over-pressure opening, said channel having an open side along the face of the one member from the outer frame to the inner ring, at least one of said ribs being located on said planar face for supporting the surface of said filter element along said channel and wherein some of said ribs have an outer distal end integral with said outer frame, and the other of said base and cover members also including a peripheral port communicating with a central over-pressure opening and a support which supports another surface of the planar filter element and which defines flow passages along the face of the other member.

30. The oil filter assembly as in claim 29, wherein others of said ribs have a radially outer end spaced radially inward from said outer frame.

31. A filter assembly, comprising:

a base member having a planer face, a cover member having a planar face, and a planar filter element disposed between said planar faces of said base and cover members, each of said base and cover members having an outer frame extending away from the face of the respective member around the periphery of the member, a peripheral port opening exteriorly of the member, and a central over-pressure opening along the geometric axis of the member, with an inner ring extending outwardly away from the face of the respective member and surrounding the central opening, each of said base and cover members including a channel formed into the planar face of the respective member extending radially inward from the port to the central over-pressure opening to fluidly interconnect the port with the central over-pressure opening, said channel having an open side along the face of the member from the outer frame to the inner ring, each of said base and cover members also having a plurality of support members, each of said support members projecting outwardly from the planar face of the respective member and interspersed across the planar face from the central over-pressure opening to the outer frame, said support members i) defining flow passages along the face of the respective member, and ii) having distal outer ends in a common plane for supporting a respective surface of said planar filter, at least one of said support members being disposed on said planar face along each side of said channel for supporting the respective surface of said filter element along said channel.

32. The filter assembly as in claim 31, wherein said at least one support member is suspended over said channel.

33. The filter assembly as in claim 32, wherein said at least one support member extends across said channel, from the inner ring to the outer frame.

34. The filter assembly as in claim 32, wherein said at least one support member extends across said channel, from the planar face on one side of said channel to the planar face on the other side of said channel.

35. A filter assembly, comprising:

a base member having a planar face, a cover member having a planar face, and a planar filter clement disposed between said planar faces of said base and cover members, each of said base and cover members having an outer frame extending away from the face of the respective member around the periphery of the member, a peripheral port opening exteriorly of the member, and a central over-pressure opening along the geometric axis of the member, with an inner ring extending outwardly away from the face of the respective member and surrounding the central opening, each of said base and cover members including a channel formed into the planar face of the respective member extending radially inward from the port to the central over-pressure opening to fluidly interconnect the port with the central over-pressure opening, said channel having an open side along the face of the member from the outer frame to the inner ring, each of said base and cover members also having a plurality of support members, each of said support members projecting outwardly from the planar face of the respective member and interspersed across the planar face from the central over-pressure opening to the outer frame, said support members i) defining flow passages along the face of the respective member, and ii) having distal outer ends in a common plane for supporting a respective surface of said planar filter, one of said support members extending across and suspended over said channel for supporting e respective surface of said filter element along said channel.

36. The filter assembly as in claim 35, wherein said one support member extends across said channel, from the inner ring to the outer frame.

37. The filter assembly as in claim 35, wherein said one support member extends across said channel, from the planar face on one side of said channel to the plan face on the other side of said channel.

38. The filter assembly as in claim 35, wherein a truss rib intersects the one support member to support the one member relative to the planar surface.

39. The filter assembly as in claim 38, wherein the truss rib has one end fixed to the planar face of the member, and another end fixed to the support member, the truss rib also being suspended over the channel.

40. The filter assembly as in claim 39, wherein the upper edge of the truss rib is co-planar with the support ribs.

* * * * *